United States Patent [19]

Wilson

[11] E Patent Number: Re. 32,647

[45] Reissued Date of Patent: Apr. 19, 1988

[54] TRAILER FOR AN ARTICULATED VEHICLE

[76] Inventor: Frederick G. Wilson, Culcavey, Hillsborough, County Down, Northern Ireland

[21] Appl. No.: 935,233

[22] PCT Filed: Jan. 28, 1983

[86] PCT No.: PCT/GB83/00015

§ 371 Date: Sep. 28, 1983

§ 102(e) Date: Sep. 28, 1983

[87] PCT Pub. No.: WO83/02594

PCT Pub. Date: Aug. 4, 1983

Related U.S. Patent Documents

Reissue of:

[64] Patent No.: 4,546,969
Issued: Oct. 15, 1985
Appl. No.: 541,342
Filed: Sep. 28, 1983

[30] Foreign Application Priority Data

Jan. 28, 1982 [GB] United Kingdom ..... 8202497

[51] Int. Cl.[4] ..... B62D 33/04

[52] U.S. Cl. ..... 296/181; 296/182; 296/183; 296/198; 296/204; 280/686

[58] Field of Search ..... 296/181, 182, 183, 204, 296/187, 191, 198, 52, 51, 62; 280/789, 7888, 686

[56] References Cited

U.S. PATENT DOCUMENTS

| | | | |
|---|---|---|---|
| 2,045,166 | 6/1936 | Robinson | 296/181 |
| 2,466,832 | 4/1949 | Wallace | 280/788 |
| 2,579,003 | 12/1951 | Josephian | 296/181 |
| 3,097,877 | 7/1963 | Erlandsen | 296/181 |
| 3,188,131 | 6/1965 | Attwood | 296/183 |
| 3,776,400 | 12/1973 | Schwartz | 296/181 |
| 3,796,457 | 3/1974 | Hinchliff | 296/181 |
| 4,924,671 | 5/1977 | Isobe | 296/51 |

FOREIGN PATENT DOCUMENTS

| | | |
|---|---|---|
| 53871 | 1/1947 | France . |
| 1109700 | 1/1956 | France . |
| 1157946 | 6/1958 | France . |
| 1513120 | 1/1968 | France . |
| 2291898 | 6/1976 | France . |

*Primary Examiner*—Robert R. Song
*Attorney, Agent, or Firm*—Mason, Fenwick & Lawrence

[57] ABSTRACT

A low floored trailer has a base frame welded to wheel arches and flooring formed over the major part of corrugated sheet welded to the base frame and overlaid with wood, between the wheel arches i.e. above the wheel axles, the floor is formed by a flat plate. Upright corrugated walls are also welded to the base frame. The axles are supported by springs carried by cross beams in the wheel arches to that the load carried by the trailer is transmitted through the springs to the base frame in the vicinity of the wheel arches and into the upright walls. Because of the lowness of the floor a larger than usual internal height is obtained, which is important especially where the overall height of the trailer is restricted by regulations.

16 Claims, 3 Drawing Sheets

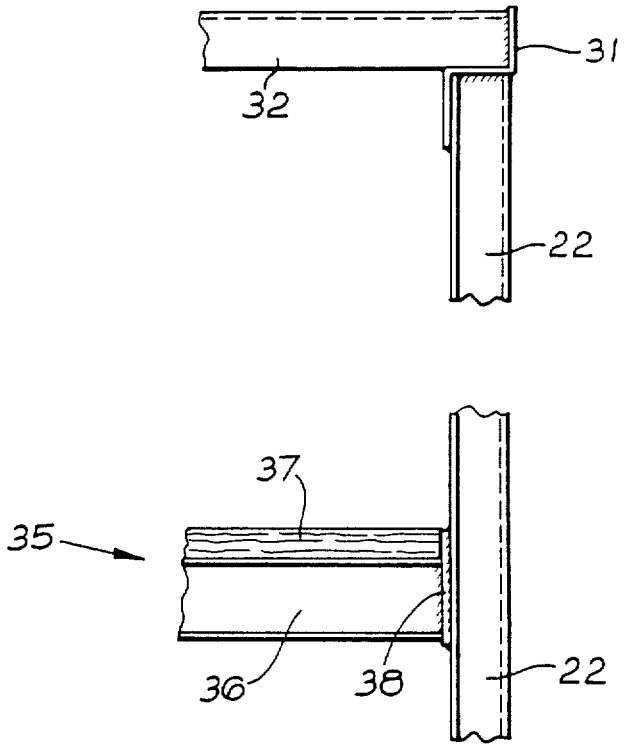
Fig. 2
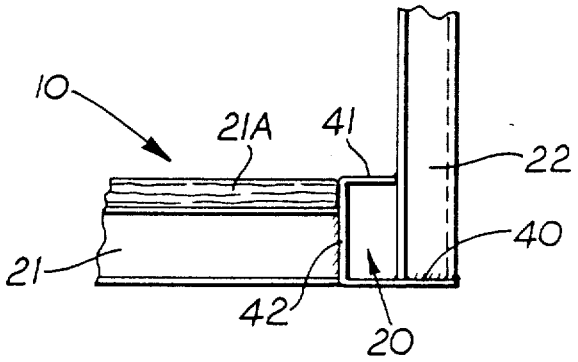

TRAILER FOR AN ARTICULATED VEHICLE

Matter enclosed in heavy brackets [ ] appears in the original patent but forms no part of this reissue specification; matter printed in italics indicates the additions made by reissue.

This invention relates to a trailer for coupling to the traction unit of an articulated vehicle or to the rear of a Lorry. The trailer is intended for use principally as a conventional trailer, but it can also be used as a mobile work shop, kitchen/diner unit, exhibition unit and the like.

A disadvantage of known trailers is the height of the trailer floor off the ground; for heavy goods transporters, this height can be as much as 5 feet, and is otherwise not less than 3 feet. As there is normally a height restriction on the trailer roof the carrying capacity is therefore limited by those two factors. The reason for the floor height restriction is the presence of a strong chassis capable of bearing the loads to be carried and it is an object of this invention to provide a trailer which has no load bearing chassis and in which the only structural member between the top of the axles and the floor surface between the wheel arches is a flat plate of about six millimeter-thickness so that the floor height can be lighter than normal for heavy goods trailers. Thus, the capacity of the trailer, whose height is limited by law, is increased.

According to the present invention, there is provided a trailer having at least one pair of transversely spaced wheel arches carrying at least one wheel axle via spring means, a horizontally disposed base frame attached to said wheel arches substantially adjacent to the level of the axles so that the frame is below the level of the tops of the wheels, a floor supported by said frame, a major portion of which floor is formed of corrugated sheet welded to the base frame, and corrugated upright wall members also welded to the base frame and supporting a roof frame, the weight of the load carried by the trailer being transmitted through the axle springs to the base frame in the vicinity of the wheel arches and into the upright walls.

Preferably, an intermediate floor is provided at a location between the base frame and the roof frame, said intermediate floor being formed of corrugated sheet material welded to the side walls of the trailer.

Preferably also, the base floor between the wheel arches is formed by a plate.

Preferably also, the or each floor is overlaid with wood.

Preferably also, a counterbalance door is provided in at least one side wall and comprises upper and lower door portions pivotal horizontally and interconnected by a linkage so that movement of one panel causes corresponding movement of the other.

An embodiment of the present invention will now be described, by way of example, with reference to the accompanying drawings, in which:

FIG. 2 is a fragmentary cross sectional elevation of a detail.

Figure 1:
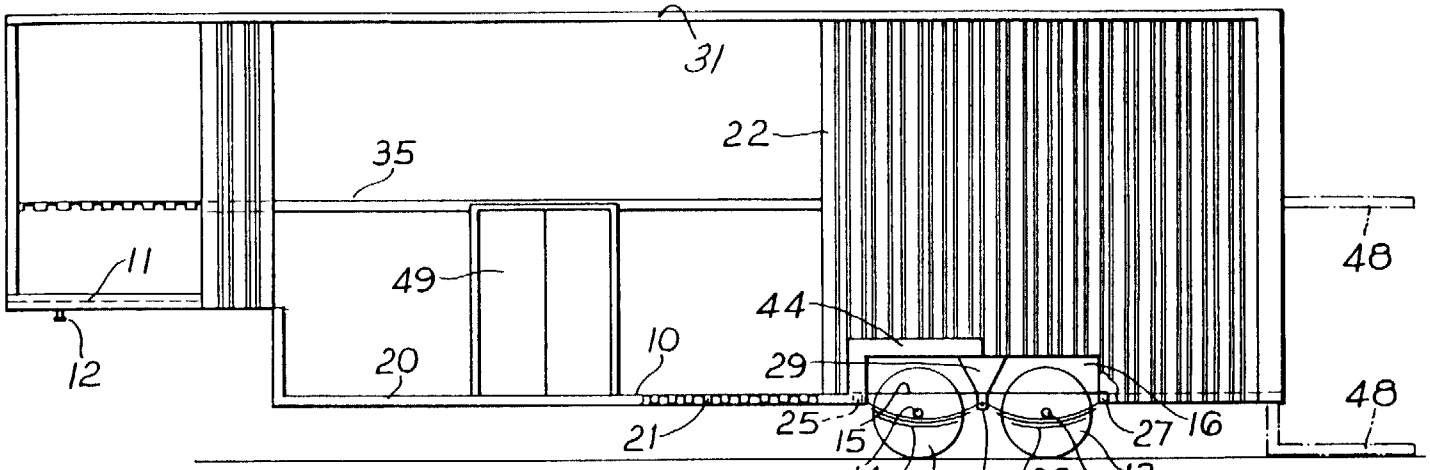
FIG. 1 is a side elevation partly in section of a trailer according to the invention with parts omitted for illustrative purposes.

Referring firstly to FIG. 1, a trailer is shown which is 12 m long, 2.4 m wide and with a base floor 10 the surface of which is only 0.558 m above ground level, as explained more fully hereinafter.

At the front end of the trailer is a stepped portion 11 to accommodate thereunder a towing pin 12 for connection to the fifth wheel coupling of the traction and of an articulated lorry; alternatively, a turntable axle may be provided for towing by drawbar.

The trailer illustrated has two pairs of double wheels 13 which may be the standard 825×15 twin tyres, thus placing the centres of the wheel axles 14 at a height of 0.419 m off the ground; for axles of 0.126 m dia., the upper limit of the axle is therefore 0.48 m. The underside of the floor 10 of the trailer can be about 0.076 m above the axles 14 in order to provide space for vertical oscillation of the axles during use. A flat heavy gauge steel plate 15 of 0.635 cm can provide the flooring above the axle, thus setting the height of the floor surface at 0.558 m above ground level.

The wheels 13 are located in a pair of transversely spaced wheel arches 16 formed of the same heavy gauge steel plate material and the said floor plate 15 is welded between the arches.

Also welded to the arches 16 is a horizontally disposed base frame 20 of box or channel frame metal as detailed hereinafter FIGS. 2 to 4, the upper limit of which is 0.558 m off the ground and the depth being 0.064 m.

The flooring is formed by continuously welding corrugated sheet steel panels 21 to the base frame 20 the corrugations being transversely disposed and of 5.07 cm depth. The lower face of the floor panels 21 lie level with the lower face of the base frame 20 and sheets or planks of wood 21A, overlie the corrugated flooring 21 to bring the floor up to the level of the steel plate 15 thus providing a level floor 10 obstructed only at the wheel arches 16 which extend about 0.058 m in from the sides 22 of the trailer. The total depth of the floor (except at the plate 15) is 0.064 m. The corrugated sheets 21 are of 14 gauge minimum thickness.

The side and front walls of the trailer are formed from similar corrugated steel panels 22 continuously welded to the base frame 20 with the corrugations upright.

At the wheel arches 16, three transverse beams 25–27 are provided two (25, 27) at the front and rear ends of the arches and one 26 centrally. These beams carry axle springs 28 and the central beam 26 is connected to the top of each arch by a substantially V shaped block 29 for even distribution of the load which is carried from the axle springs 28 into the base frame surrounding the wheel arches and into a large section of each side wall 22. Thus, the side walls 22 are the load bearing members of the trailer, taking the function of the normal chassis.

A roof frame 31 is welded to the top of the side and end walls 22 and enclosed by a roof 32 formed of corrugated sheet panels continuously welded thereto. The assembled roof provides rigidity for the walls 22 of the trailer so that they do not deflect in transit. The corrugations of the roof are disposed transversely and of 4 cm depth. Thus, for a trailer whose height is restricted to 4 m, the internal height of the container from floor to roof is 3.42 m.

In view of the internal height gained by the low location of the floor it is possible to include within the trailer an upper deck 35 as illustrated in FIGS. 1 and 2.

The upper deck 35 is formed of the same type of corrugated sheet 36 and wood covering 37 as used on the base floor and thus has a depth of only 0.064 m. The height above each deck 10, 35 can therefore be 1.71 m (where the overall height of the trailer is limited to 4 m).

The upper deck 35 extends the full length of the trailer so it overlies the stepped portion 11 and is welded to the side and front walls of the trailer either directly or via a peripheral plate 38. Preferably the floor 36 is first welded to the surrounding plate 38 and then the assembly is welded to the upstanding walls 22.

The plate may be flat and vertically disposed or box or channel section.

Figure 4:
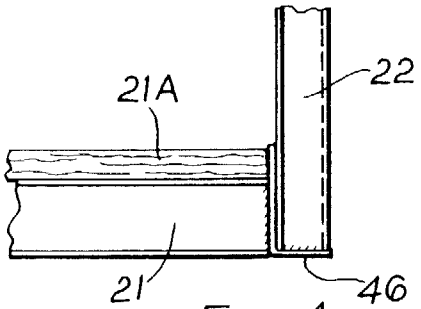
FIG. 4 is a further alternative detail to that shown in FIGS. 2 and 3.
Figure 3:
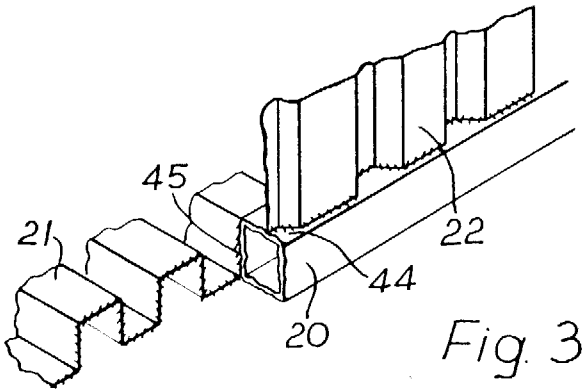
FIG. 3 is a fragmentary perspective of an alternative detail.

The base frame 20 may also be of various forms as illustrated in FIGS. 2 to 4; in the preferred form (FIG. 2) the frame 20 is of channel section outwardly facing and with the lower horizontal flange 40 of greater width than the upper one 41. The base floor panels 21 are welded to the inner face of the web 42 and the upright side panels 22 are supported on the lower flange [60] *40* and welded to both flanges 40, 41.

In FIG. 3 the frame 20 is of box section; the upright side panels 22 are welded to the top 44 and the floor panels [20] *21* are welded to the inner face 45. In FIG. 4 the frame is of right angled section with the horizontal limb 46 extending outwardly.

In FIG. 1, at the right hand side thereof, the alternative forms of FIG. 3 and FIGS. 2 and 4 are illustrated, the box frame [44] *20* (FIG. 3) being visible when the construction is used, while when the channel and angle sections are used, they lie behind the side panels 22. For a double-decked trailer a tail lift 48 is provided at the rear end. Tail lifts are well known and usually consist of a platform connected by wire ropes to an hydraulic cylinder powered by batteries and operated by controls from ground level. The lift can have a lifting capacity of 1 ton. The platform extends across the width of the trailer and is about 1.2 m long. When not in use it folds upright to form part of the rear door.

A doorway 49 is provided in at least one side wall 22, opening into the lower deck 10, the opening extending from the lower deck to the upper deck 35 and closeable by a pair of vertically hinged doors. The doorway 49 is positioned remote from the wheel arches 16 and from the stepped portion 11 at the front of the trailer.

Figure 5:
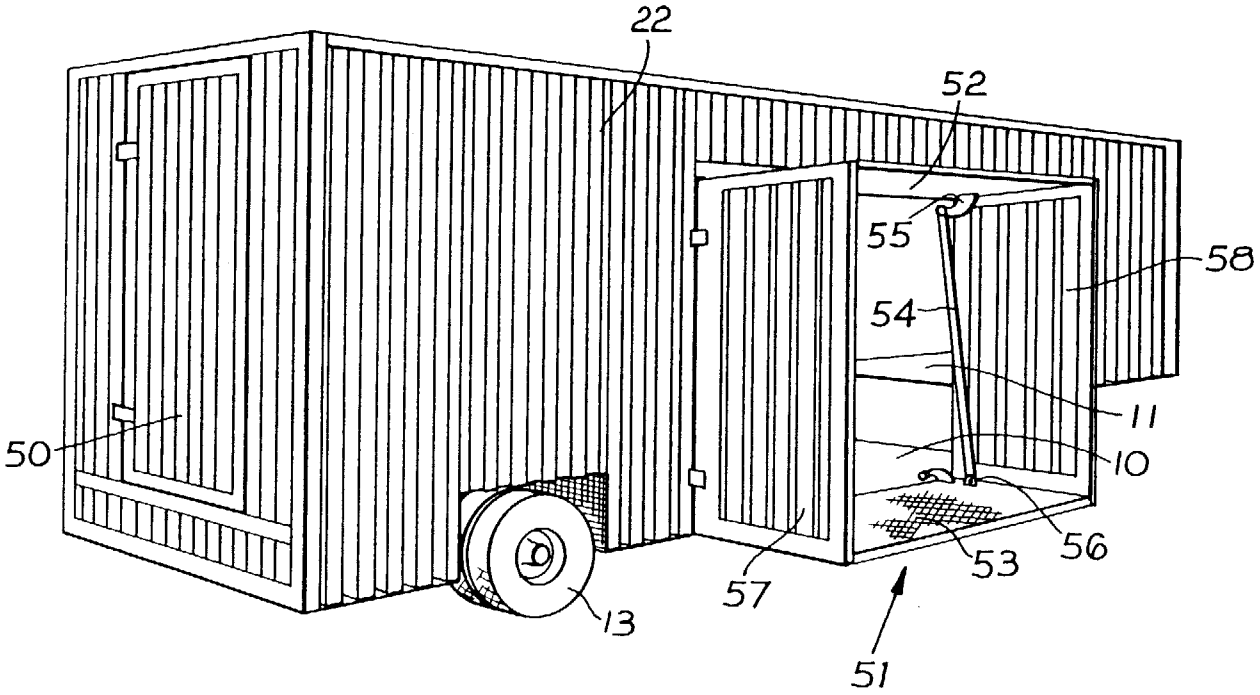
FIG. 5 is a perspective side elevation of another trailer according to the invention.

Reference is now made to FIG. 5 in which the trailer has no upper deck; such a trailer can be used for other than as a container; for example as a mobile workshop and the side doorway 51 can be wider and also higher but no more than ⅗rd length of the side wall. One suitable doorway is illustrated in FIG. 5 and is in the form of a counterbalance door which comprises a pair of rectangular doors 52, 53 hinged horizontally along a major side and connected by a linkage 54 so that downward movement of one door causes corresponding upward movement of the other. The upper panel 52 carries a depending plate 55 at each end, the plates being parallel, transverse of the trailer and extending inwards beyond the door panel 52. The lower panel 53 has an upstanding transverse lug 56 at each end spaced from the inner end of the door. A lingage 54 connects each lug 56 with the corresponding plate 55 and thus extends upwardly and inwardly from the lug. With the door panels open and in parallel as shown in FIG. 5, a covered vestibule is formed. To close the counterbalance door, the lower door panel 53 is raised and pushes the inner end of the upper panel plate 55 upwards, thus pivoting the upper panel 52 downwards. The counterbalance door is preferably an inner door normally concealed behind a pair of vertically hinged outer doors 57, 58. These outer doors also serve as sides for the vestibule as shown in FIG. 5, having means for engaging the lower door panel 53 in its horizontal position. A rear door 50 is provided.

In an alternative arrangement, the vertically hinged doors are the inner doors; this arrangement permits an opening of longer length for example 3 meters which is closed when the counterbalance door is vertical i.e. closed. When the counterbalance door is open, the upper and lower portions lie horizontal and the vertically hinged doors can be opened to form the sides of the vestibule. Each vertically hinged door has a width equal to half the length of the counterbalance door.

The one-deck trailer is primarily for use in transporting heavy goods, for which purpose the side doors are optional; with the side doors however, the trailer can be used for purposes other than as a conventional trailer, for example as a mobile workshop, and a gantry crane unit can be incorporated including a longitudinal track attached to the underside of the roof to carry a crane capable of lifting two tons into and out of the trailer via the rear end.

The trailer can also be used as a mobile exhibition unit or the like, or as a mobile kitchen/diner, the vestibule allowing full use of the trailer interior and thus increasing the effective working area. Two one-deck trailers, for example, can be placed side by side so that with their counterbalance doors in the open position an enclosed walkway is provided between the trailers. One trailer could house the kitchen and storage area and the other could form the dining area.

The primary use of the trailer however, is as a transporter of goods and in this it is advantageous because of its low level base frame and floor. Many commodities have bulk rather than weight and because of the low floor base, the capacity of the trailer is substantially increased over normal trailers. In addition, the low head-room provided in the two deck trailer means that goods are not stored above head-height, with a consequent reduction in possible accidents to persons loading the trailer. The level base floor permits movement of pallets, even past the wheel arches which intrude into the base floor area.

I claim:

1. A road trailer comprising:

(a) a pair of transversely spaced wheel arches carrying at least one wheel axle via spring means;

(b) a horizontally disposed base frame attached to said wheel arches substantially adjacent to the level of said axle so that said base frame is below the level of the tops of wheels attached to each end of said axle;

(c) a floor supported by said base frame; and (d) corrugated upright wall members supported by said base frame for supporting a roof frame, the weight of the load carried by said trailer being transmitted through said spring means to said base frame in the vicinity of said wheel arches and into said upright wall members;

(e) said floor comprising a major portion formed of corrugated sheet material attached to said base frame and a minor portion disposed between said wheel arches and above said wheel axle and being formed of flat steel plate having an upper surface which is level with the upper surface of said major portion and an underside disposed substantially higher than an underside of said major portion and only a short distance above said wheel axle to allow for vertical movement of said wheel axle, thereby to provide a low-lying floor unobstructed along its length apart from each wheel arch.

2. A trailer according to claim 1 characterised in that an intermediate floor is provided at a location between the [face] *base* frame and the roof frame, said intermediate floor being formed of corrugated members welded to the sides of the trailer.

3. A trailer according to claim 2, characterised in that each of said first-mentioned floor and intermediate floor is overlaid with wood.

4. A trailer as claimed in claim 1 characterised in that a counterbalance door is provided in at least one of said upright walls and comprises upper and lower door panels pivotal horizontally and interconnected by a linkage so that movement of one panel causes corresponding movement of the other panel.

*5. A road trailer comprising:*

*(a) a pair of transversely opposed wheel arches;*

*(b) at least one wheel axle carried in said wheel arches; and*

*(c) a wheel mounting assembly having a front and a back and comprising:*

*at least two transverse beams, a first of said beams being located at said front of said assembly and a second of said beams being located at said back of said assembly, said first and second beams being attached directly to said wheel arches; and*

*spring means connected between adjacent ones of said beams for supporting said at least one wheel axle, the weight of the load carried by said trailer being transmitted through said spring means to said wheel arches.*

*6. The road trailer of claim 5, further comprising:*

*(d) a pair of frame members, each of said frame members being connected to one of said wheel arches and following the contours of said one of said wheel arches to which it is connected.*

*7. The road trailer of claim 5, further comprising:*

*(d) a floor; and*

*(e) a flat plate attached to the upper surfaces of said beams so as to form a part of said floor.*

*8. The road trailer of claim 6, further comprising:*

*(d) a floor; and*

*(e) a flat plate attached to the upper surfaces of said beams so as to form a part of said floor.*

*9. A road trailer comprising:*

*(a) a pair of transversely opposed wheel arches,*

*(b) first and second wheel axles carried in said wheel arches;*

*(c) a wheel mounting assembly having a front and a back and comprising:*

*first, second, and third transverse beams, said first beam being located at said front of said assembly, said second beam being located at said back of said assembly, and said third beam being located centrally of said assembly, said first and second beams being attached directly to said wheel arches and said third beam being connected to the top of said wheel arches;*

*connection means for connecting said third beam to the tops of said wheel arches; and*

*first and second spring means, said first spring means being connected between said first and third beams for supporting said first wheel axle and said second spring means being connected between said second and third beams for supporting said second wheel axle, whereby the weight of the load carried by said trailer which is evenly distributed through said spring means to said wheel arches.*

*10. The road trailer of claim 9, further comprising:*

*(d) a pair of frame members each of said frame members being attached to one of said wheel arches and following the contours of said one of said wheel arches to which it is connected.*

*11. The road trailer of claim 9, further comprising:*

*(d) a floor; and*

*(e) a flat plate attached to the upper surfaces of said beams so as to form a part of said floor.*

*12. The road trailer of claim 10, further comprising:*

*(d) a floor; and*

*(e) a flat plate attached to the upper surfaces of said beams so as to form a part of said floor.*

*13. The trailer of claim 9, said connection means having an inverted "V" shape.*

*14. The trailer of claim 10, said connection means having an inverted "V" shape.*

*15. The trailer of claim 11, said connection means having an inverted "V" shape.*

*16. The trailer of claim 12, said connection means having an inverted "V" shape.*

* * * * *